United States Patent [19]

Shedigian

[11] 4,456,945
[45] Jun. 26, 1984

[54] CAPACITOR

[75] Inventor: Vandos Shedigian, Indianapolis, Ind.

[73] Assignee: Emhart Industries, Inc., Indianapolis, Ind.

[21] Appl. No.: 394,289

[22] Filed: Jul. 1, 1982

[51] Int. Cl.$^3$ .......................... H01G 1/01; H01G 4/06
[52] U.S. Cl. ...................................... 361/305; 361/313
[58] Field of Search ............... 29/25.42; 361/313, 314, 361/315, 323, 324, 304–308

[56] References Cited

U.S. PATENT DOCUMENTS

| | | | |
|---|---|---|---|
| 3,012,176 | 12/1961 | Williams et al. | 361/308 X |
| 3,048,750 | 8/1962 | Netherwood et al. | 361/314 X |
| 3,179,862 | 4/1965 | Dubilier | 361/305 |
| 3,419,770 | 12/1968 | Tomago et al. | 361/324 |
| 3,857,073 | 12/1974 | Yagitani | 361/324 X |
| 3,970,904 | 7/1976 | Murfitt et al. | 361/314 |
| 4,320,437 | 3/1982 | Shaw et al. | 361/323 X |

FOREIGN PATENT DOCUMENTS

| | | | |
|---|---|---|---|
| 52-64654 | 5/1977 | Japan | 361/314 |

*Primary Examiner*—Donald A. Griffin
*Attorney, Agent, or Firm*—Robert F. Meyer

[57] ABSTRACT

A capacitor of the type including a pair of rolled electrode sheets and dielectric spacer interleaved therebetween with the dielectric spacer including at least one sheet of polypropylene film, provides the dielectric spacer with at least one sheet of polyethylene teraphthalate film.

6 Claims, 3 Drawing Figures

CAPACITOR

BACKGROUND OF THE INVENTION

1. Field Of The Invention

The present invention generally relates to capacitors having roller electrode sheets and, in particular, to such capacitors which use polypropylene film as a dielectric spacer between the roller electrode sheets.

2. Statement Of The Prior Art

Alternating current capacitors having rolled electrode sheets are well known and widely used. Such capacitors generally include a pair of electrode sheets interleaved with a pair dielectric spacer means, with the entire combination being cylindrically rolled. Manufacturers of such capacitors usually experiment with various materials for use in constructing such capacitors for such purposes as increasing capacity, improving space efficiency, improving capacitor reliability and thereby reducing overall capacitor cost. One approach towards these goals is to use polypropylene film as the dielectric spacer between the electrodes. Earlier capacitors typically used paper as the dielectric spacer. Although paper is still used, it does not have a very high breakdown voltage for preventing arcing between the electrodes, thus lowering volumetric efficiency by requiring both greater amounts of material for higher operating voltages and also larger electrode area due to increased electrode spacing. Polypropylene film, on the other hand, enjoys a high dielectric constant and a very high breakdown voltage, which promotes volumetric efficiency for the capacitor along with larger capacitance values for capacitors of similar size.

In the area of reliability, a major factor affecting performance is the arcing or corona discharge between electrodes within the capacitor roll due to the presence of air. The presence of air allows oxidation, the products of which cause interelectrode arcing. Manufacturers have attempted to use various means for reducing or eliminating the presence of air within the capacitor roll. One common method involves impregnating the capacitor roll with oil and then heat shrinking the roll to squeeze out as much of the oil as possible along with any air still remaining. Unfortunately, this approach has not been completely successful with polypropylene film dielectric spacers. This is because polypropylene film is not easily wetted by many of the various known dielectric fluids. This inhibits penetration of the capacitor roll by dielectric fluid along with its purging of trapped air therefrom. One approach which claims to remedy some of these problems is disclosed in U.S. Pat. No. 3,363,156. This patent discloses a special dielectric fluid along with a dielectric spacer including sheets of capacitor grade paper interleaved with sheets of polypropylene film. The paper is used to wick the special dielectric fluid into the capacitor roll for the purpose of covering the polypropylene film. Unfortunately, this approach still suffers from a certain amount of volumetric inefficiency due to the presence of the paper which separates the electrodes more than they need to be.

SUMMARY OF THE INVENTION

Accordingly, the present invention provides a capacitor roll having polypropylene film as a dielectric spacer, which capacitor roll is more easily wetted by impregnating oil to thereby improve the removal of air from the roll and improve reliability of the capacitor. The present invention generally resides in a capacitor of the type including a pair of rolled electrode sheets and dielectric spacer means interleaved therebetween, with the dielectric spacer means including at least one sheet of polypropylene film, wherein the improvement comprises the dielectric spacer means also including at least one sheet of polyethylene teraphthalate film. This improvement may be used in capacitors having either foil sheets as electrodes or in capacitors having electrodes formed by the deposition of metallized film on the surface of a substrate.

BRIEF DESCRIPTION OF THE DRAWINGS

The present invention is illustratively shown and described in the accompanying drawings in which.

DETAILED DESCRIPTION OF THE DRAWINGS

Figure 1:
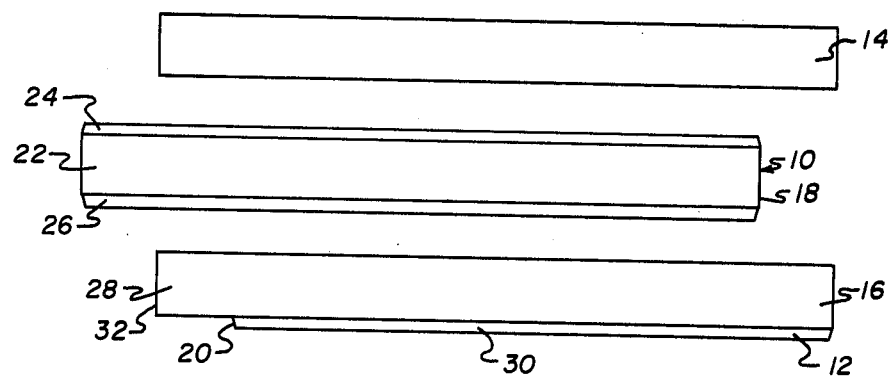
FIG. 1 is a representation end view of a combination of electrodes and dielectric spacer means constructed in accordance with one embodiment of the present invention.

In Reference to FIG. 1, an end view of a pair of electrodes 10 and 12 is shown with intermediate dielectric spacers 14 and 16. FIG. 1 is a representational end view of the electrodes and dielectric spacers as they would appear prior to rolling and from the perspective in which they would appear if they were rolled as they came directly up from the plane of FIG. 1. To this end, electrode 10 is displaced slightly to the left to protrude from the left side of the electrode roll formed accordingly. Likewise, electrode 12 is displaced slightly to the right to extend from the right side of the electrode roll formed accordingly. The dielectric material sheet 14 is made of polypropylene film and is interleaved between the electrodes 10 and 12 to separate the electrodes by extending past the right end 18 of electrode 10 and past the left end 20 of electrode 12.

Electrode 10 is generally formed using a paper sheet substrate 22 and forming metallized film 24 and 26 on both sides thereof. The metallized film in the present case is formed by the vapor deposition of aluminum. Another suitable metal which may be used is zinc. The layers 24 and 26 may extend to the edges of the paper substrate 22 as the dielectric materials 14 and 16 are located to overlap the right hand edge thereof.

The electrode 12 is formed by using a polymeric film, polyethylene teraphthalate, also known under the trademark MYLAR, as a substrate 28 for a metallized film 30 and as the dielectric spacer 16. The film 30 may be formed in the same manner as the films 24 and 26, but is only located on one side of the substrate 28. Some surface preparation of the chemically inert polymeric film, such as high frequency electrical discharge, may be required in order to obtain proper adhesion of the metallized film. As shown, the film 30 stops short of the left end 32 of the substrate 28.

It should be noted that the view of FIG. 1 is only representational and disproportionate in both relative and actual size representation. The actual thicknesses of the respective substrates and film layers will depend upon design criteria for individual capacitors and also upon manufacturing limitations of the materials used. As an approximate example, the polypropylene film may have a thickness on the order of 10 to 15 microns while an aluminum film layer may have a thickness on the order of 0.5 to 0.10 microns.

Figure 2:
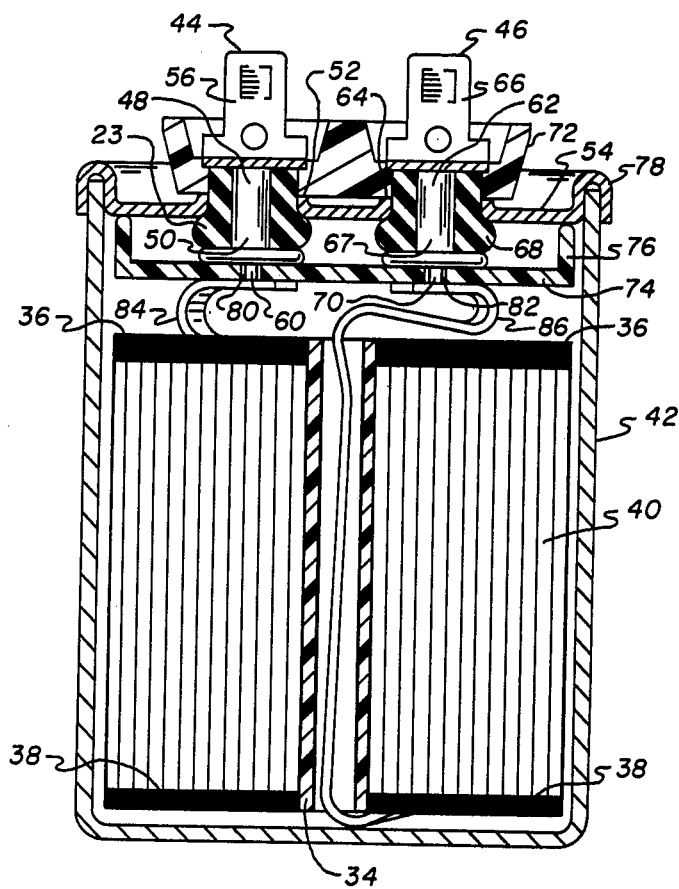
FIG. 2 is a sectional view of a completed capacitor constructed in accordance with an embodiment of the present invention.

The electrodes and dielectric spacers as shown in FIG. 1 are rolled around a hollow core mandrel 34 as shown in FIG. 2. Generally, this rolling is performed with a certain amount of tension to form a tight roll and thereby limit the number and size of spaces or pockets between the electrodes 10 and 12 and the dielectric spacers 14 and 16. The use of mandrel 34 aids in the formulation of a tight roll. Any suitable chemically inert material may be used for the mandrel 34. The electrode roll thus formed may then be further tightened by heat treating. This causes shrinkage of the polymeric film and thereby tightening of the roll.

Electrical contact is made with the electrodes 10 and 12 after they are rolled and heat shrunk, by schooping or spraying the ends of the roll with zinc 36 and 38. Due to the opposing displacement of the electrodes in the roll, the sprayed zinc 36 and 38 is able to contact each electrode at the respective end of the roll to which it is displaced. The sprayed zinc cannot penetrate the roll sufficiently to contact both electrodes at either end thereof.

The capacitor roll 40 formed thereby is shown located in a housing 42 having terminal assemblies 44 and 46 extending from the housing 42 for forming electrical connection to the electrodes. Terminal assemblies 44 and 46 generally include means for minimizing the hazard of overpressurization of the housing 40 by providing an electrical disconnection of the electrode roll when the pressure within the housing reaches a predetermined level. As pressure build-up is normally caused by the overheating of the electrode roll under electrical stress, electrical disconnection removes the source of heat and thus prevents overpressurization.

Generally, terminal assembly 44 includes a rivet 48 having a shank 50 projecting through aperture 52 in a cover 54. An external terminal end 56 is suitably attached to the shank 50. An electrically insulating washer 23 retains the rivet 48 spaced from electrical contact with the cover 54. The rivet 48 includes a protrusion 60 which is discussed in greater detail below. Terminal assembly 46 is constructed similarly to that of terminal assembly 44 and includes a rivet 62 projecting through aperture 64 in the cover 54, an external terminal end 66 suitably attached to the end of shank 67, an electrically insulating washer 68 retaining the rivet 62 in spaced relationship from electrical contact with cover 54, and a protrusion 70. Terminal assembly 44 and terminal assembly 46 are further retained in place by electrically insulating means 72.

An apertured, substantially non-flexible member 74 is adjacent to the cover 54. The member 74 includes length and width dimensions that approximate the corresponding dimensions of the cover 54. The dimensions of the member 74 as well as the dimensions of the cover 54 may be those associated with an oval, circle, rectangle, square or the like. The member 74 includes a peripheral reinforcing means or rib 76 which engages or contacts an area adjacent edge 78 of the housing 40. The rib 76 reinforces and thereby helps to render the member 74 non-flexible. Member 74 includes apertures 80 and 82 formed therethrough for protrusions 60 and 70 respectively. Apertures 80 and 82 are formed larger than their respective protrusions to allow relative movement of the protrusions. Each of the protrusions 60 and 70 extends through its respective aperture and a very short distance beyond the bottom of member 74. Member 74 is fabricated from any suitable non-flexible and electrically insulating material such as glass reinforced polyamide, or a phenolformaldehyde resin, or the like.

Electrode connection 84, a metallic lead or tab strip suitably attached to and extending from one electrode via zinc spraying 36, is bonded, such as by welding or the like, to the end of the protrusion 60 extending through the aperture 80 and slightly beyond the adjacent surface of the non-flexible member 74. Electrode connection 86, a metallic lead or tab strip suitably attached to and extending from the other electrode via zinc spraying 38, is bonded, such as by welding or the like, to the end of the protrusion 70 extending through the aperture 82 and slightly beyond the adjacent surface of the non-flexible member 74. The width configuration of each of the connections 84 and 86 is greater than the cross-sectional configuration of the adjacent aperture formed in member 74 so that neither of the connections 84 and 86 is able to freely move into its adjacent aperture.

In the event of overheating of the capacitor and the generation of gases within the sealed housing 42, the increased pressure within the housing caused thereby will in turn cause the doming of the cover 54. Upon doming of the cover 54, protrusion 60 or protrusion 70 or both are displaced relative to the non-flexible member 74 causing the electrode connection 84 and/or the electrode connection 86 to engage with the adjacent surface of the non-flexible member 74. Further doming of the cover 54 causes further displacement of one or both of the protrusions 60 and 70 relative to the non-flexible member 74 and the connections 84 and 86. Such displacement of one or both of the protrusions 60 and 70 relative to the non-flexible member 74 and the connections 84 and 86 causes either one or both of the connections to electrically uncouple from its heretofore electrically associated protrusion thereby rendering the capacitor inoperative. Thusly, removing the application of electrical current from the capacitor will normally remove the cause of overheating and gas generation and thereby reduce further substantial pressurization.

After the electrode roll 40 is located within housing 42 and cover 54 is attached, the capacitor is impregnated with dielectric fluid by immersing the capacitor in a fluid bath under conditions of vacuum and heat. These conditions help to draw air out of the capacitor roll and cause better impregnation of the roll 40 due to improved viscosity of the dielectric fluid. The dielectric fluid enters the housing 42 through a vent hole (not shown) in cover 54. After proper impregnation the capacitor is removed from the bath and the vent hold is sealed.

Figure 3:
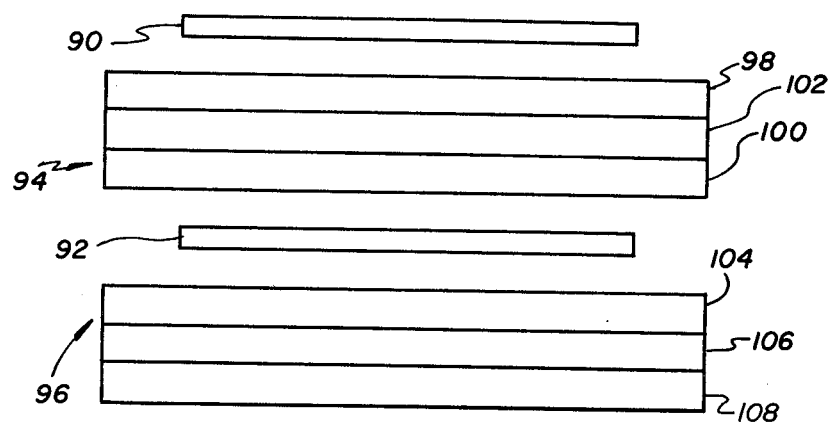
FIG. 3 is a representational end view of a pair of electrodes and dielectric spacer means constructed in accordance with another embodiment of the present invention.

FIG. 3 shows a representational end view of a pair of electrodes and dielectric spacer means constructed in accordance with another embodiment of the present invention. Generally included are a pair of foil electrodes 90 and 92 and a pair of dielectric spacer means 94 and 96. Foil electrodes 90 and 92 may be made from any suitable capacitor electrode foil such as aluminum. Dielectric spacer means 94 generally includes a pair of polypropylene film sheets 98 and 100 which are separated by a sheet of polyethylene teraphthalate film 102. Dielectric spacer means 96 generally includes a pair of polypropylene film sheets 104 which are separated by a sheet of polyethylene teraphthalate film 106. Depending upon the application, both of the sheets of polypropylene film 98, 100 and 104, 108 are not necessary for each of the dielectric spacers 94 and 96. Thus each spacer 94 and 96 may also be constructed with only single sheets of polypropylene film each.

The electrodes 90 and 92 and the dielectric spacers 94 and 96 are generally rolled from the end shown in FIG. 3. Any suitable means of electrode connectors may be used for connection to the electrodes 90 and 92. Also, the electrodes and dielectric spacers may be rolled around a mandrel, such as the mandrel 34 shown in FIG. 2, with some tension to limit the amount of air trapped between the electrodes and film sheets. After rolling, the resulting electrode roll is normally placed inside a capacitor body, such as 42 in FIG. 2, and the electrodes 90 and 92 are connected to connector terminals such as 44 and 46 in FIG. 2. Thereafter, the capacitor is closed but not sealed and a hole is left in the cover 54 to allow the ingress of dielectric fluid.

The dielectric fluid is an insulating type and the preferred fluid for the present invention is phenylxylylethane, abbreviated XPE. This fluid is available as XPE from the Hatco Chemical Corp. of Fords, N.J. and also from the Nippon Petrochemicals Co., Ltd. of Japan under the names PXE or Nisseki Condenser Oil .S. This dielectric fluid has been found to have a favorable contact angle or wetability with polyethylene teraphthalate. When the polyethylene teraphthalate film comes into contact with the dielectric fluid, the fluid easily spreads out over the surfaces of the film to displace most of the air still located therebetween.

Dielectric fluid is introduced into the unsealed capacitor by means of a dielectric fluid bath located in an evacuated oven. The heat makes the dielectric fluid more viscous for better impregnation and the vacuum helps to draw air out of the electrode roll. Continued heating causes the electrode roll to shrink and squeeze out additional air bubbles remaining therein. This air is allowed to escape from the top of the capacitor which has not yet been sealed. After a suitable amount of heating, the capacitor body is removed from the oven and sealed to prevent dielectric fluid from leaking and to prevent air from entering the capacitor body.

Capacitors constructed in accordance with the embodiments described above should enjoy the benefits of large capacity or volumetric efficiency due to the use of polypropylene film as a dielectric spacer while maintaining a high degree of reliability and a corresponding reduction in the criticality of manufacturing methods to thereby reduce cost. This is due to the reduced arc amound of space taken up by the dielectric spacers and the reduced amount of air remaining between the electrodes and dielectric spacers.

The above described embodiments of the present invention are intended to be taken in an illustratively and not a limiting sense. Various modifications and changes may be made to the above described embodiments by persons skilled in the art without departing from the scope of the present invention as defined by the appended claims.

What is claimed is:

1. A capacitor comprising a pair of rolled electrode sheets and dielectric spacer means interleaved therebetween, said dielectric spacer means including at least one sheet of polypropylene film and at least one sheet of polyethylene teraphthalate film, one of said pair of electrode sheets being a metallized film layer formed on one surface of said polyethylene teraphthalate film and the other of said pair of electrode sheets being a pair of metallized film layers formed on opposite surfaces of a paper sheet, and a housing carrying said rolled electrode sheets and dielectric spacer means, and electrical terminals electrically connected to said electrode sheets.

2. The capacitor of claim 1, further comprising a dielectric fluid including phenylxylylethane impregnating said capacitor.

3. The capacitor of claim 1, wherein said sheet of polyethylene teraphthalate film is located adjacent said sheet of polypropylene film.

4. The capacitor of claim 3, further comprising a second sheet of polypropylene film and a second sheet of polyethylene teraphthalate film wherein said second sheets are located adjacent each other.

5. The capacitor of claim 4, further comprising a third sheet of polypropylene film located adjacent to and on the opposite side of first said sheet of polyethylene teraphthalate film from first said sheet of polypropylene film.

6. The capacitor of claim 5, further comprising a dielectric fluid including phenylxylylethane impregnating said capacitor.

* * * * *

UNITED STATES PATENT AND TRADEMARK OFFICE
CERTIFICATE OF CORRECTION

PATENT NO. : 4,456,945
DATED : June 26, 1984
INVENTOR(S) : Vandos Shedigian

It is certified that error appears in the above—identified patent and that said Letters Patent is hereby corrected as shown below:

Col. 1, line 30, delete "a high dielectric constant and".

Col. 5, line 37, change "more" to---less---.

Signed and Sealed this

Twenty-ninth Day of January 1985

[SEAL]

*Attest:*

DONALD J. QUIGG

*Attesting Officer*     *Acting Commissioner of Patents and Trademarks*